JOHN BASSLER.
Improvement in Car Couplings.
No. 124,780.          Patented March 19, 1872.
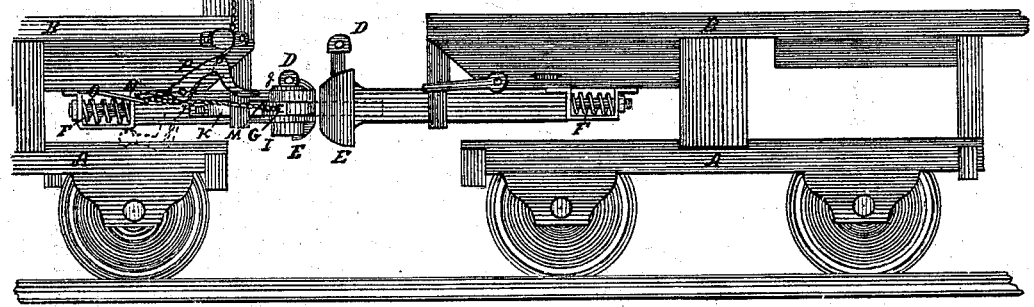

124,780

UNITED STATES PATENT OFFICE.

JOHN BASSLER, OF GALESBURG, ILLINOIS.

IMPROVEMENT IN CAR-COUPLINGS.

Specification forming part of Letters Patent No. 124,780, dated March 19, 1872.

SPECIFICATION.

*To all whom it may concern:*

Be it known that I, JOHN BASSLER, of Galesburg, in the county of Knox, in the State of Illinois, have invented certain new and useful Improvements in Car-Coupling; and I do hereby declare the following to be a full, clear, and exact description thereof, which will enable others skilled in the art to which my invention appertains to make and use the same, reference being had to the accompanying drawing forming part of this specification, in which—

Figure 1 represents a side elevation of a car provided with my improvements. Fig. 2 is a top or plan view of my coupling detached; and Fig. 3 is a vertical section, taken at the line $x\ x$ of Fig. 2, except that the hook is represented as open in the sectional view.

My invention relates to that class of car-couplings operated by hooks and catches; and consists in certain improvements to facilitate the operation thereof, a more full and particular description of which is hereinafter set forth.

A is a railway car-truck. B is the platform or floor of the car. C represents the top of a car. D is an ordinary coupling-pin, to be used with the usual coupling-link. E is the buffer, and F is the buffer-spring. G is a hook attached to the draw-head or buffer. $g$ is a pin passing through supporting plates or brackets between which the hook G rests, and through the said hook, in order to hold the latter there in place. The lower plate or bracket I is so made as to form a recess below the hook. J is a coil spring in the recess of the plate or bracket I. The coil spring J has one of its ends fixed in the bottom of the plate or bracket I, and the other end in the hook H, so as to hold the said hook against the side of the draw-head or buffer, in the position shown in Fig. 2. The upper plate or bracket I may be also so made and provided with a like spring. H is a shoulder or catch, for the purpose of engaging with the hook G. The inner face of the catch or shoulder H as well as the inner face of the hook G, or the faces of the catch and hook which are adjacent when engaged with each other, are beveled in the manner shown in Fig. 2, so that the hook will firmly retain its position on the catch during the movement of the cars. The hook G when not engaged with the catch H, retains the position in relation to the buffer or draw-head to which it is attached, shown in Fig. 2, by reason of the hook striking the lateral face of the draw-head. K is a flat spring attached to the side of the draw-head, with its free end resting on the hook G, and having an outward pressure. The rear end of the hook G upon which the spring K rests, is eccentric or cam-shaped, so that, as the hook G is thrown back in the direction indicated by the broken or dotted line in Fig. 2, the spring K presses on the cam of the hook and forces the hook forward, when the latter is released. This spring K is auxiliary to the spring J, or either spring may be used without the other. The outer face of the catch H and of the hook G is rounded off, so that as these faces come in contact, the hook G will ride over the catch H and engage with it so as to couple the cars. L is a pin or post, against which the shoulder $l$ strikes, for the purpose of preventing the hook from being turned too far back. When a car provided with my improvement is to be attached to a car provided with the ordinary coupling-link and pin, the link is inserted in the buffer, and the pin D is passed through it in the usual manner.

In order to operate my improved coupling without going between the cars, I have made use of the following mechanism: M is a chain attached to the forward end of the hook G; this chain is then carried back and attached to the crank-shaft N, which is bent crank-shaped beneath the car, the attachment of the chain being made upon the crank-arm thus formed. When the hook G is open, as shown in Fig. 1, the crank-arm to which the chain M is attached, is slightly below the bearing of the shaft N; and O is a hook, upon which the crank-arm rests, so that the hook G may remain open until the crank-arm is raised from its position on said hook O. P is a crank or lever upon the outer end of the crank-shaft N. In order to release the spring G, so that it will be in a position to couple, the crank P is pushed downward until the crank-arm of the crank-shaft N is above the bearings of the shaft, when the crank P will be thrown into the position shown by the broken or dotted lines in Fig. 1, by means of the springs K and J, and the chain M will thus be slackened. M' is a chain attached to the crank or lever P, and extending to the top of the car; and P' is a crank-shaft to which it is there attached, so that the crank or lever P may be thereby operated for the purpose of uncoupling the car.

The operation of my invention will be obvious from the foregoing description. It may be added that the hooks G G have a sufficient lateral play when coupled, to admit of the swaying motion of the cars without being released, while the rounded face of the hook and catch is such, that the operation of coupling will take place notwithstanding this swaying movement. The vertical face or edge of the catch or shoulder H is also of sufficient extent, vertically, to enable the coupling to be used on cars having platforms of different heights from the track, or in connection with ordinary draw-heads at various distances above the track.

Having thus described my invention, what I claim, and desire to secure by Letters Patent, is—

1. A railway-car draw-head or buffer, provided with a slot and hole for the reception of a coupling-link and pin, and with the ridge or catch H and stop L, in combination with the hooks G G, provided with the shoulder $l$, and one or more spiral springs, J, substantially as and for the purpose specified.

2. In combination with the subject-matter of the foregoing claim, crank-shaft K, chain M, and hook O, arranged beneath the car, substantially as and for the purpose specified.

3. In combination with the subject-matter of the last-above claim, lever P for operating crank-shaft N, chain M', and crank-shaft P', all arranged substantially as and for the purpose specified.

JOHN BASSLER.

Witnesses:
E. C. FIELD,
S. K. McCULLOUGH.